Figure 1:
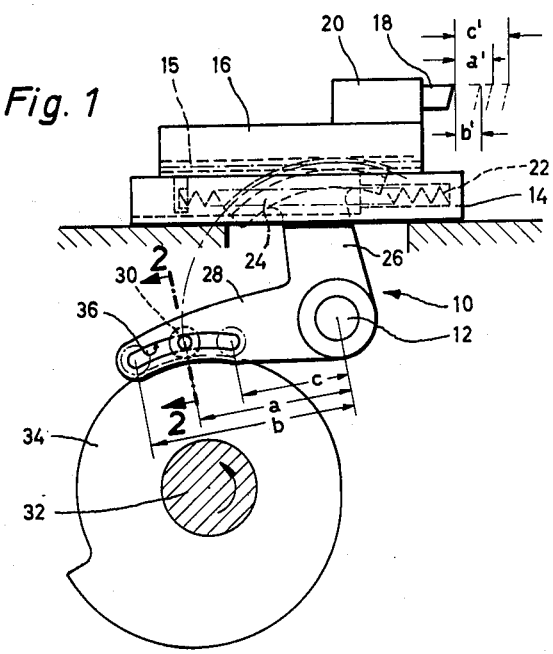

Inventor:
Karl Spohn
by Michael S. Striker
Atty

United States Patent Office 3,262,346
Patented July 26, 1966

3,262,346
ADJUSTABLE DRIVES FOR MACHINE TOOL CARRIAGES AND THE LIKE
Karl Spohn, Esslingen (Neckar), Germany, assignor to Index-Werke KG Hahn & Tessky, Esslingen, Germany
Filed Feb. 17, 1964, Ser. No. 345,317
Claims priority, application Germany, Feb. 20, 1965, J 23,205
1 Claim. (Cl. 82—24)

The present invention relates to machine tools.

More particularly, the present invention relates to automatic machine tools such as lathes or automatic screw machines. Such automatic machine tools include a carriage which may carry, for example, a cutting tool, and during each cycle of the automatic operation the carriage is automatically reciprocated back and forth along a given stroke. The reciprocation of such a carriage is conventionally derived from a rotary cam which through a suitable transmission reciprocates the carriage back and forth along its stroke.

In order that the machine tool may be able to perform a wide variety of jobs it is highly desirable to be able to adjust the stroke of the carriage, and at the present time it is possible to adjust this stroke through a relatively complex linkage which forms part of the transmission from the cam to the carriage and which includes a system of levers and links which can be adjusted so as to adjust the stroke of the carriage. This known construction is disadvantageous in the first place because it is relatively complex, in the second place because it requires an undesirably large amount of space, and in the third place because it includes a large number of bearings, at least five, each of which is a source of play in the transmission, so that with this known construction it is difficult to eliminate play from the drive of the carriage with the result that vibrations and chattering are unavoidable, sometimes rendering it impossible to machine a perfectly smooth surface.

It is accordingly a primary object of the present invention to provide a construction of the above type which makes it possible to adjust the stroke of the carriage but which eliminates the drawbacks of the known structure.

Thus, it is an object of the invention to provide between the cam and the carriage a transmission which is far simpler than the known transmissions while at the same time being capable of selective adjustment for regulating the size of the stroke of the carriage.

A further object of the present invention is to provide a construction of the above type where the transmission between the cam and carriage is far more compact than and requires far less space than conventional transmissions of the above type.

In addition, it is an object of the present invention to provide in an assembly of the type discussed above a transmission which includes an extremely small number of bearings so that the possibility of play in the transmission is very greatly reduced as compared to conventional transmissions.

In addition, it is an object of the present invention to provide an exceedingly simple and rugged structure composed of a small number of elements which will operate reliably even when under relatively great stress and which can be very conveniently adjusted in a relatively short time to change the size of the stroke of the carriage.

With these objects in view the invention includes, in a machine tool, a carriage means and a guide means supporting the carriage means and guiding it for movement back and fourth along a given stroke. A lever means has a predetermined turning axis and is operatively connected to the carriage means to reciprocate the latter along its stroke during swinging of the lever means back and forth about its turning axis. A cam means transmits its movement to a cam follower means which, in accordance with the present invention, is connected to the lever means by an adjustable mounting means capable of being adjusted so as to select the distance of the follower means from the turning axis of the lever means so that in this way the stroke of the carriage means can be adjusted. The direct mounting of the cam follower means on the lever means provides a major simplification of conventional transmissions of the type discussed above while at the same time making the adjustment of the stroke possible and eliminating such drawbacks as excessive play and excessive space occupied by the structure.

Figure 2:
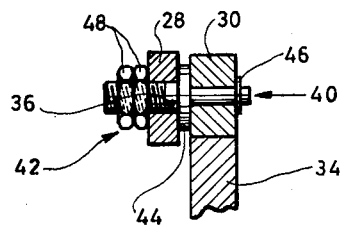

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

FIG. 1 is a fragmentary partly schematic side elevation of one possible structure according to the invention; and FIG. 2 is a fragmentary sectional view of an adjustable mounting means according to the invention, the section of FIG. 2 being taken along line 2—2 of FIG. 1 in the direction of the arrows.

Referring now to the drawings, and to FIG. 1 in particular, there is illustrated therein a lever means 10 in the form of a bell crank supported by a stationary pin 12 for turning movement about the axis of the pin 12. This lever means 10 is operatively connected to a carriage means 16 to reciprocate the latter back and forth, to the right and left, as viewed in FIG. 1, along a given stroke. A guide means 14 is fixedly carried by the bed of the machine and supports the carriage means 16 and guides the latter for movement along its stroke, the guide means 14 having suitable guide ways along which complementary parts of the carriage means 16 slide, in a manner well known in the art. In the illustrated example the carriage means 16 carries a schematically illustrated tool holder 20 which carries a cutting tool 18. The guide means 14 carries in a suitable recess a compression spring 22 which presses against a projection of the carriage means 16 to urge the latter to the left to the illustrated starting position.

In the illustrated example the operative connection of the lever means 10 to the carriage means 16 is by way of a gear sector 24 fixedly carried by the end of the arm 26 of the lever means 10 which is distant from the turning axis of the lever means 10, this end of the arm 26 and the gear sector 24 extending through a suitable space in the guide means 14. The gear sector 24 meshes with an elongated rack 15 fixed to the underside of the carriage means 16 and extending in the direction of the stroke thereof.

The lever means 10 is adapted to swing back and forth about its turning axis, which coincides with the axis of the stationary pivot 12, for moving the carriage means 16 back and forth along its stroke, and the swinging movement of the lever means 10 is derived from a rotary cam means 34 which is fixed to the rotary cam shaft 32 of the machine tool, this shaft 32 carrying in a known way the structure which controls the operation of the machine tool. The cam 34 has a peripheral camming edge engaged by a cam follower means formed by a roller 30, and in accordance with the present invention this roller 30 is directly carried by the lever means 10 by way of an adjustable mounting means which can be adjusted to change the distance between the roller 30 and the turning axis of the lever means 10. The stroke of the carriage means 16 will be determined according to the selected distance between the axis of the roller 30 and the turning axis of the lever means 10.

The adjustable mounting means includes a portion of the second arm 28 of the bell crank which is formed with an elongated slot 36 one end of which is located nearer to the turning axis of the lever 10 than the other, and the slot 36 has a curvature which generally corresponds to the curvature of the periphery of the cam 34. The adjustable mounting structure further includes a pin means 40 (FIG. 2) capable of being releasably fixed to the arm 28 by a releasable fixing means 42 so that by selecting the position of the pin means 40 along the slot 36 it is possible to adjust the distance between the axis of the roller 30 and the turning axis of the lever 10. The pin means 40 extends through the slot 36 and fixedly carries a collar 44 which projects beyond the slot and engages one face of the lever arm 28. The roller 30 is turnably supported on the pin means 40 between the collar 44 and a snap ring 46 so that in this way the cam follower roller 30 is free to rotate but cannot move axially.

The releasable fixing means 42 includes in the illustrated example, a threaded portion of the pin means 40 which extends to the left, as viewed in FIG. 2, beyond the arm 28 and which threadedly carries a pair of lock nuts 48. Thus, by loosening the nuts 48 it is possible to shift the pin means 40 along the slot 36, and when the selected distance between the axis of the shaft 12 and the axis of the roller 30 is obtained the lock nuts 48 are tightened to releasably fix the pin means and thus the roller 30 at a selected distance from the turning axis of the lever means 10.

In the position of the parts shown in FIG. 1 the cam follower roller has its axis situated approximately midway between the ends of the slot 36 at a distance $a$ from the turning axis of the lever means 10, and with this adjustment the transmission means formed by the lever 10 and the structure carried thereby will provide the carriage means 16 with a stroke equal to the distance $a'$ shown in FIG. 1. If the cam follower roller is situated with its axis as close as possible to the right end of the slot 36, as viewed in FIG. 1, nearest to the axis of the lever 10, the axis of the roller 30 will be spaced from the axis of the lever 10 by the distance $c$ and in this case the transmission means extending between and operatively engaging the cam 34 and the carriage 16 will provide the latter with the stroke $c'$. At the other end position of the axis of the roller 30, where this axis is situated as close as possible to the left end of the slot 36, as viewed in FIG. 1, the axis of the roller 30 will be spaced from the turning axis of the lever 10 by the distance $b$, and this adjustment will provide the carriage with its shortest stroke $b'$, shown in FIG. 1.

It is particularly to be noted that the structure of the invention includes a simple lever 10 and a single cam follower directly carried thereby and adjustable therewith so that the structure of the invention is exceedingly simple and compact. Furthermore, it will be seen that the transmission includes but two bearings, namely the bearing formed by the portion of the pin means 40 which supports the roller 30 and the bearing formed by the portion of the shaft 12 which supports the lever 10, so that the possibility of play resulting from movement of elements in bearings is limited only to these two bearings with the structure of the invention.

It will be understood that each of the elements described above, or two or more together, may also find a useful application in other types of machine tools differing from the types described above.

While the invention has been illustrated and described as embodied in automatic machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a machine tool, in combination, carriage means having an underside; guide means supporting said carriage means and guiding the latter for movement back and forth along a given stroke; an elongated rack fixed to said underside of said carriage means and extending in the direction of said stroke thereof; a gear sector meshing with said rack; bell crank means having a predetermined turning axis which extends perpendicularly to said rack and which includes the center of curvature of said gear sector, said bell crank means having one arm fixedly carrying said gear sector at an end of said one arm distant from said axis, said bell crank means having a second arm longer than said one arm and formed with an elongated slot one end of which is nearer to said axis than the other; elongated, collared pin means substantially parallel to said turning axis and extending through said slot; means releasably fixing said collared pin means to said second arm in said slot thereof so that the distance of said pin means from said axis can be selected according to the position of said pin means in said slot; cam follower roller means rotatably carried by said pin means; and rotary cam means having a camming portion engaged by said roller means, whereby the selected location of said pin means along said slot will determine the size of the stroke of said carriage means.

References Cited by the Examiner

UNITED STATES PATENTS

| 1,604,204 | 10/1926 | Tessky | 82—24 |
| 2,692,509 | 10/1964 | Gibson | 74—53 |

FOREIGN PATENTS

| 30,838 | 11/1907 | Austria. |
| 550,259 | 12/1922 | France. |
| 678,748 | 4/1951 | Great Britain. |

WILLIAM W. DYER, Jr., *Primary Examiner.*

L. VLACHOS, *Assistant Examiner.*